Feb. 3, 1959  J. R. WILSON  2,872,164
HEAT EXCHANGERS
Filed Nov. 19, 1956
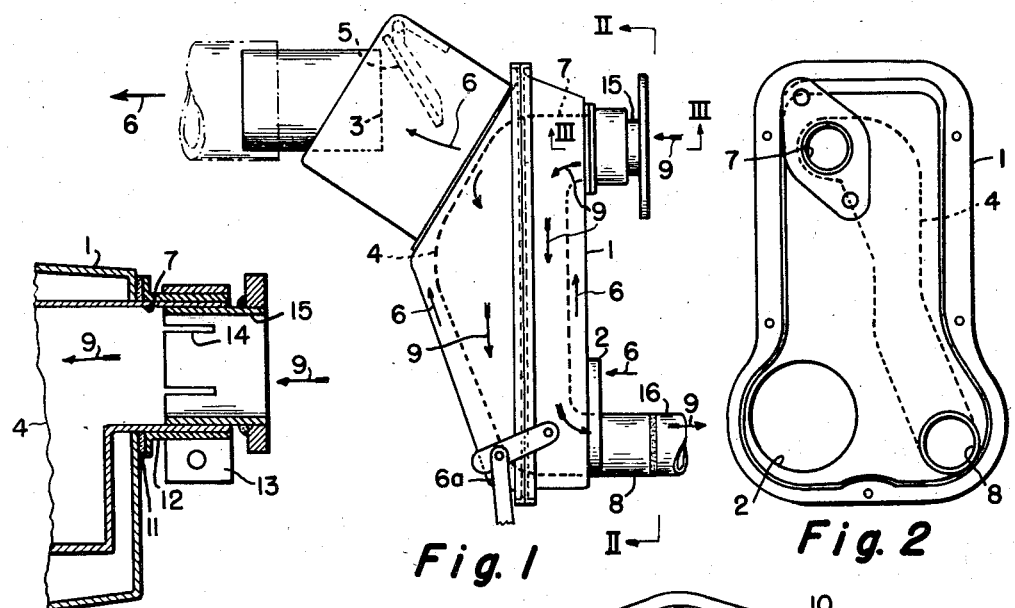
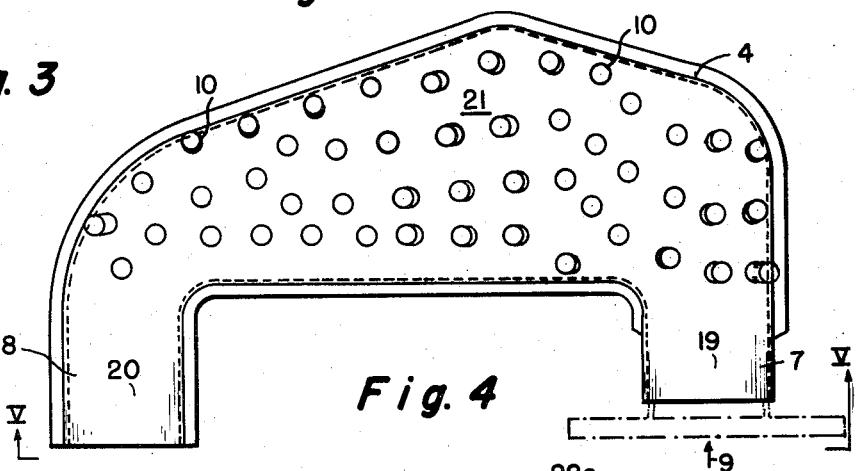
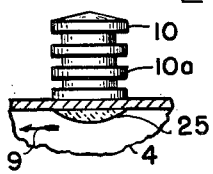
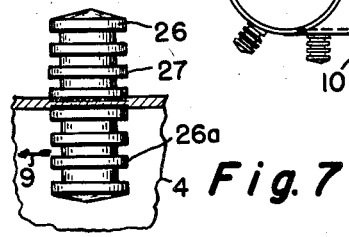
INVENTOR.
John R. Wilson
BY Webb, Mackey & Burdon
HIS ATTORNEYS United States Patent Office 2,872,164
Patented Feb. 3, 1959

2,872,164

HEAT EXCHANGERS

John R. Wilson, Penn Township, Allegheny County, Pa., assignor to Hanlon & Wilson Company, Pittsburgh, Pa., a corporation of Pennsylvania Application November 19, 1956, Serial No. 623,074

2 Claims. (Cl. 257—241)

This invention relates to heat exchangers and more particularly to heat exchangers which utilize hot exhaust gases from the engine of a vehicle for warming the interior of the vehicle's body.

Heretofore, some automobile heaters or heat exchangers have been unsatisfactory in that they were incapable of adequately warming an automobile's interior, especially when the vehicle was standing with the motor idling. Many of these heaters have employed the hot exhaust gases from the engine but have been unsuccessful in effecting a transfer of much of the heat contained in the exhaust gases for warming fresh air to be delivered into the car's interior.

One problem encountered by manufacturers of motor vehicle heat exchangers which employ hot exhaust gases is that of making the exchanger gas-tight while at the same time, effecting a substantial heat transfer from the exhaust gases to the fresh air to be delivered into the automobile body. It is essential that passengers in the car be free from exposure to engine exhaust gases and accordingly, it is vital that the heat exchangers be gastight. Generally, manufacturers have succeeded in producing a heat exchanger which is either gas-tight but delivers inadequately warmed air, or which delivers adequately warmed air but is prone to developing leaks thereby, exposing the passengers to deadly monoxide fumes.

My invention effects a substantial heat exchange between hot exhaust gases of a vehicle engine and fresh air to be delivered into the vehicle's body and is gas-tight and not prone to developing gas leaks. Specifically, my heat exchanger comprises a duct which conveys a heated medium therethrough and a housing which encloses the duct and wherein the duct is spaced from the walls thereof. The housing has an air inlet and an air outlet so arranged that the air to be warmed enters the housing and flows around and in engagement with the duct before it exits and travels into the vehicle's body. The duct has one end adapted to be connected to a source of a heated medium and the other end adapted to be connected to an exhaust conduit which conveys the heated medium from the housing. Affixed to the outer surface of the duct is a plurality of pins having heat radiating fins.

In the accompanying drawings, I have shown preferred embodiments of my invention in which:

Figure 1 is a side elevation view of one embodiment of my heat exchanger;

Figure 2 is a view along the line II—II of Figure 1;

Figure 3 is a section view along the line III—III of Figure 1;

Figure 4 is a plan view of the duct of Figure 1;

Figure 5 is a section view along the line V—V of Figure 4;

Figure 6 is an enlarged side elevation view partly in section of a pin affixed to the duct of Figure 4; and Figure 7 is a side elevation view partly in section of a modification of the pin of Figure 6.

As shown in Figures 1 and 2, my heat exchanger comprises a housing 1 having an air inlet 2 and an air outlet 3 with the inlet positioned adjacent the bottom of the housing so that fresh air to be warmed enters the bottom of the housing and flows upwardly around and in engagement with a duct 4 enclosed by the housing 1. The air outlet, as shown in Figures 1 and 2, is located adjacent the upper part of the housing 1 and is controlled by a valve 5. A damper 6a controls the amount of air admitted into the housing through the air inlet 2. Arrows 6 represent the flow of the fresh air through the housing to the vehicle's body.

As shown in Figures 1 and 2, the housing encloses the duct 4 which is spaced from the walls thereof except where the two ends 7 and 8 of the duct extend therethrough. Hot exhaust gases from at least one cylinder of a vehicle's engine enter the end 7 of the duct and flow downwardly therethrough and exit from the housing through the other end 8 as shown by arrows 9. A study of Figure 1 shows that the hot exhaust gases flow countercurrent to the air to be warmed by engagement with the outer surface of the duct and with pins 10 to be described hereinafter.

As shown in Figure 3, an asbestos washer 11, a flanged ring 12, and a clamp 13 fit around the periphery of the end 7 and effect a seal between the end 7 and the housing. A similar washer, flanged ring and clamp combination produce a seal between the other end 8 and the housing.

The end 7 of the duct telescopes with a slotted end 14 of a conduit 15 which delivers the exhaust gases to the housing. The clamp 13 (Figure 3) fits around both the end 7 of the duct and the slotted end 14 of the conduit 15 for effecting a gas-tight seal therewith.

The other end of the duct is welded to a pipe 16 which connects the duct to a muffler (not shown).

Referring to Figures 4 and 5, the duct 4 comprises two half shell members 17 and 18 welded together to form a three-section unit having two end sections 19 and 20 interconnected by a central section 21. The half shell members 17 and 18 have peripheral flanges 17a and 18a respectively which extend substantially therearound. Flange 17a is adapted to engage flange 18a or vice versa in a sealing relationship to form the duct 4. The central section itself has three parts with one being a receiving chamber 22 for the hot exhaust gases delivered from the engine cylinders and with a second part being a discharge chamber 23 for the hot exhaust gases exiting from the duct 4 into the pipe 16. The third part is a connecting chamber 24 which interconnects the receiving chamber and the discharge chamber and is diagonally disposed therebetween. As shown in Figures 4 and 5, the receiving chamber 22 comprises an elbow and has its far wall 22a disposed substantially opposite the end part 19. This wall 22a extends angularly toward and joins with a wall 24b of the connecting chamber 24. As shown in Figure 5, the connecting chamber 24 has a neck portion, indicated by the reference numeral 24c. This neck portion enhances the swirling action of hot exhaust gases flowing through the duct as will be described hereinafter. The walls of the discharge chamber 23 are angularly disposed relative to the walls forming the connecting chamber 24 where the walls of the discharge chamber join with the walls of the connecting chamber.

The construction and arrangement of the three parts of the central section of the duct produces a swirling action in the gases flowing through the duct and effects a tortuous path of flow for the hot gases. In other words, the hot exhaust gases entering the receiving chamber 22 strike the far wall 22a thereof, then are directed to the connecting chamber 24 where they strike the near wall 24a thereof and thence into the discharge chamber where they contact the far wall 23a thereof. Thus the hot gases are given a swirling and a tortuous path of flow whereby a large portion thereof engage and contact the inside of the duct walls while flowing through the receiving, connecting and discharge chambers. Generally, in the flow of the hot gases through the duct 4, there is a continuous swirling action so that the gas does not stratify into layers of relatively cool gases adjacent the walls of the duct and layers of relatively hotter gases adjacent the core of the duct. The swirling action imparted to the exhaust gases as they traverse the duct 4 breaks up stratification of gases and materially enhances heat exchange between the gases and the fresh air which enters the housing through the inlet 2.

To further enhance heat exchange between the hot gases and the fresh air, I increase the surface area of the duct 4 by enlarging its width (Figure 4).

A plurality of pins 10 welded to the outer surface of the central section 21 of the duct 4 materially increase the heat radiating surface of the duct, thus effecting a good heat exchange between the exhaust gases and the fresh air. Each pin has heat radiating fins 10a and is affixed to the outer surface of the central section by projection welding which comprises passing a heavy surge of electric current through the pin to the surface of the duct at an instant just before the pin is brought into engagement with the surface. This surge of current effects a good strong weld between the pin and the duct without rupturing or breaking the surface of the duct.

As shown in Figure 6, opposite each pin on the inside surface of the duct is a dimple 25 which is produced by projection welding. Each dimple extends inwardly from the inside surface of the duct into the exhaust gases and increases heat exchange between the exhaust gases and the fresh air by capturing heat from the gases and conveying it to the pin extending into contact with the cool air and by breaking up stratification of the gases, and by assisting in imparting a swirling action to the hot gases.

When hot gases flow through a conduit, pipe, duct, tube, etc., they stratify or separate into layers of cool gases which collect and concentrate along and around the inside periphery of the conduit and into layers of relatively hot gases concentrated around and along the core of the conduit. The cool gases are generally stagnant or flow at low velocities and thus insulate the walls of the conduit from the hotter gases and prevent an efficient heat transfer between the hot gases and the medium in contact with the ouside surface of the conduit. The hot gases travel at a high velocity relative to the speed of the cool gases. Hence, to obtain a good heat exchange between the hot gases within the conduit and the medium in contact with the outside surface thereof, the hot gases along the conduit core must be brought into engagement with the inside periphery of the conduit. The dimples 25 (Figure 6) tend to break up stratification of the cooler gases and in cooperation with the structure of the central section 21 of the duct 4, impart a swirling action to the hot exhaust gases delivered into the collecting chamber 22, thereby enhancing heat exchange between the hot gases and the medium in contact with the outside surface of the duct 4.

The dimples 25 break up stratification of the cool gases with a small increase in back pressure within the duct.

In the embodiment of Figure 7, I projection weld a plurality of pairs of pins comprising outside pins 26 and inside pins 26a with heat radiating fins 27 to the outside and inside surfaces of the duct 4. As shown, on the inside surface of the duct there is a pin substantially opposite each pin welded to the outside surface thereof. The pins 26a on the inside surface extend inwardly into the exhaust gases and conduct heat therefrom to the duct and thence to the pins on the outside surface. The pins 26a also break up stratification of gases and assist in producing a swirling gas action.

My heat exchanger has important advantages which render it especially suitable for motor vehicles which employ hot exhaust gases to heat the vehicle body. In the first place, the pins with their heat radiating fins are welded to the outside surface and some to the inside surface of the duct and do not require any rupture or puncture in the duct for mounting thereon. Thus, I eliminate likelihood of leakage of the exhaust gases out around the juncture of the heat radiating pins and the duct shell. Since exhaust gases are highly dangerous, elimination of leakage around the pins incorporates a substantial safety factor into my invention.

In the second place, my heat exchanger, with the structure of the duct, in combination with the dimples, breaks up stratification of the gases flowing through the duct and imparts a swirling action thereto so that the hotter gases engage the dimples and inside surface of the duct, thereby increasing heat exchange with the fresh air in contact with the duct's outside surface. Thus, my heat exchanger has a high operating efficiency and when compared with certain exhaust gas heaters now in use, increases heating the fresh air by as much as 130 percent.

While certain preferred embodiments of my invention have been shown and described, it will be understood that it may be otherwise embodied within the scope of the appended claims.

I claim:

1. In a heat exchanger having a housing with an air inlet and an air outlet for flow of air to be warmed therethrough, the combination comprising a duct for conveying heated gases through the housing, said duct being disposed inside said housing and spaced from the walls thereof, said duct comprising two end parts and a center part with the center part interconnecting the end parts, one of said end parts being adapted to be connected to a source of the heated gases, the other end part being adapted to be connected to an exhaust conduit for the heated gases, said center part comprising a receiving chamber, a discharge chamber, and a connecting chamber with said connecting chamber diagonally interconnecting the receiving chamber and discharge chambers, said receiving chamber, said discharge chamber and said connecting chamber forming a tortuous path of flow for the heated gases through the duct, said receiving chamber being joined to the end part adapted for connection with the source of heated gases, said discharge chamber being joined to the end part adapted for connection to the exhaust conduit, said receiving chamber comprising an elbow and having one of its walls disposed substantially opposite the end part adapted for connection to the source of heated gases, said wall being inclined toward and joining with a wall of said connecting chamber, said receiving chamber being arranged relative to said end part adapted for connection to the heated gases and relative to said connecting chamber so that a swirling action is imparted to the heated gases flowing through said duct, and so that at least a part of the gases which strike the said one wall of the receiving chamber is directed into the connecting chamber and into engagement with a wall of said connecting chamber opposite said one wall of the receiving chamber, the walls of the discharge chamber being angularly disposed relative to the walls forming the connecting chamber where the walls of the discharge chamber join the walls of the receiving chamber, a plurality of heat radiating pins extending outwardly from the outer surface of said duct and being affixed to said duct and a plurality of dimple means on the inner surface of said duct.

2. The combination of claim 1 characterized by said duct being made from two half shell members, each having a flange adapted to engage the flange of the other half shell member in a sealing relationship to form the duct.

References Cited in the file of this patent

UNITED STATES PATENTS

| | | |
|---|---|---|
| 1,275,492 | Sterzing | Aug. 13, 1918 |
| 1,732,103 | McIntyre | Oct. 15, 1929 |
| 2,015,643 | Schmidt | Sept. 24, 1935 |
| 2,343,049 | Fassinger | Feb. 29, 1944 |

UNITED STATES PATENT OFFICE

CERTIFICATE OF CORRECTION

Patent No. 2,872,164                        February 3, 1959

John R. Wilson

It is hereby certified that error appears in the printed specification of the above numbered patent requiring correction and that the said Letters Patent should read as corrected below.

Column 2, line 69, after "swirling" insert -- action --.

Signed and sealed this 2nd day of June 1959.

(SEAL)
Attest:

KARL H. AXLINE
Attesting Officer

ROBERT C. WATSON
Commissioner of Patents